United States Patent
Murashkin et al.

(10) Patent No.: US 11,551,365 B2
(45) Date of Patent: Jan. 10, 2023

(54) METHODS AND SYSTEMS FOR COMPUTER-BASED DETERMINING OF PRESENCE OF OBJECTS

(71) Applicant: YANDEX.TAXI LLC, Moscow (RU)

(72) Inventors: Vyacheslav Vladimirovich Murashkin, Moscow (RU); Andrey Olegovich Rykov, Snezhinsk (RU)

(73) Assignee: YANDEX SELF DRIVING GROUP LLC, Moscow (RU)

( * ) Notice: Subject to any disclaimer, the term of this patent is extended or adjusted under 35 U.S.C. 154(b) by 935 days.

(21) Appl. No.: 16/369,865

(22) Filed: Mar. 29, 2019

(65) Prior Publication Data

US 2020/0090352 A1 Mar. 19, 2020

(30) Foreign Application Priority Data

Sep. 17, 2018 (RU) ............................ RU2018132850

(51) Int. Cl.
*G06T 7/33* (2017.01)
*G06N 3/08* (2006.01)
(Continued)

(52) U.S. Cl.
CPC ............ *G06T 7/337* (2017.01); *G05D 1/0248* (2013.01); *G06N 3/08* (2013.01); *G06T 7/521* (2017.01); *G06V 20/58* (2022.01)

(58) Field of Classification Search
USPC .... 382/100, 103–104, 155, 224; 701/27–28; 706/12, 20
See application file for complete search history.

(56) References Cited

U.S. PATENT DOCUMENTS 9,530,062 B2 * 12/2016 Nguyen ................ G06V 10/764
9,710,714 B2 * 7/2017 Chen ....................... G01S 17/86
(Continued)

FOREIGN PATENT DOCUMENTS

CN 108345831 A 7/2018
RU 2612571 C1 3/2017
(Continued)

OTHER PUBLICATIONS

Russian Search Report dated Jun. 18, 2020 in connection with the related Russian Patent Application RU 2018132850.
(Continued)

*Primary Examiner* — Ishrat I Sherali
(74) *Attorney, Agent, or Firm* — BCF LLP

(57) ABSTRACT

A computer-implemented method for processing a 3-D point cloud data and an associated image data to enrich the 3-D point cloud data with relevant portions of the image date. The method comprises generating a 3-D point cloud data tensor representative of information contained in the 3-D point cloud data and generating an image tensor representative of information contained in the image data; and then analyzing the image tensor to identify a relevant data portion of the image information relevant to the at least one object candidate. The method further includes amalgamating the 3-D point cloud data tensor with a relevant portion of the image tensor associated with the relevant data portion of the image information to generate an amalgamated tensor associated with the surrounding area and storing the amalgamated tensor to be used by a machine learning algorithm (MLA) to determine presence of the object in the surrounding area.

23 Claims, 8 Drawing Sheets

(51) Int. Cl.
  *G06T 7/521* (2017.01)
  *G05D 1/02* (2020.01)
  *G06V 20/58* (2022.01)

(56) References Cited

U.S. PATENT DOCUMENTS

| | | | |
|---|---|---|---|
| 9,760,090 | B2 | 9/2017 | Shashua et al. |
| 10,318,827 | B2* | 6/2019 | Jia .................... G06V 20/58 |
| 11,030,525 | B2* | 6/2021 | Wang .................. G06N 3/0454 |
| 11,433,902 | B2* | 9/2022 | Murashkin ............ G01S 7/4802 |
| 2017/0039436 | A1* | 2/2017 | Chen .................... G06T 7/44 |
| 2018/0173971 | A1 | 6/2018 | Jia et al. |
| 2020/0090352 | A1* | 3/2020 | Murashkin ............ G06K 9/629 |
| 2020/0377105 | A1* | 12/2020 | Murashkin ...... B60W 60/00272 |
| 2021/0192236 | A1* | 6/2021 | Katrenko .............. G06T 7/0002 |

FOREIGN PATENT DOCUMENTS

| | | |
|---|---|---|
| RU | 2658092 C2 | 6/2018 |
| WO | 2016/100814 | 6/2016 |
| WO | 2016/122969 | 8/2016 |
| WO | 2017157967 A1 | 9/2017 |

OTHER PUBLICATIONS

Weigel, "Vehicle tracking with lane assignment by camera and lidar sensor fusion", 2009 IEEE Intelligent Vehicles Symposium, Piscataway, NJ, USA, Jun. 3, 2009, pp. 512-520, 10.1109/IVS.2009.5164331.

European Search Report dated Oct. 16, 2019 in connection with the related European Patent Application EP19171404.7.

Liu et al., "SSD: Single Shot MultiBox Detector", UNC Chapel Hill, Zoox Inc, Google Inc., University of Michigan, Ann-Arborm 2016, pp. 1-17.

Wang et al., "Fusing Bird View LIDAR Point Cloud and Front View Camera Image for Deep Object Detection", University of California, Berkeley, 2017, pp. 1-11.

Chen et al., "Multi-View 3D Object Detection Network for Autonomous Driving", Department of Electronic Engineering, Tsinghua University, Baidu Inc., 2017, 9 pages.

Engelcke et al., "Vote3Deep: Fast Object Detection in 3D Point Clouds Using Efficient Convolutional Neural Networks", 7 pages.

Li et al., "Vehicle Detection from 3D Lidar Using Fully Convolutional Network", Baidu Research—Institute for Deep Learning, 2016, 8 pages.

Yin et al., "VoxelNet: End-to-End Learning for Point Cloud Based 3D Object Detection", 2017, 10 pages.

* cited by examiner

METHODS AND SYSTEMS FOR COMPUTER-BASED DETERMINING OF PRESENCE OF OBJECTS

CROSS-REFERENCE

The present application claims priority from Russian Patent Application No. 2018132850, entitled "Methods and Systems for Computer-Based Determining of Presence of Objects," filed Sep. 17, 2018, the entirety of which is incorporated herein by reference.

FIELD OF TECHNOLOGY

The present technology relates to computer-implemented methods and systems for determining presence of an object, more specifically, to methods and systems for determining the presence of the object around an autonomous vehicle.

BACKGROUND

Several computer based navigation systems that are configured for aiding navigation and/or control of vehicle have been proposed and implemented in the prior art. These systems range from more basic map-aided localization based solutions—i.e. use of a computer system to assist a driver in navigating a route from a starting point to a destination point; to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control system, which systems upon detection of the vehicle (or other obstacle) in front of the moving vehicle, slow down or stop the vehicle.

Some of the more advanced system provide for a fully autonomous driving of the vehicle without direct control from the operator (i.e. the driver). These autonomously vehicles include computer systems that can cause the vehicle to accelerate, break, stop, change lane and self-park.

One of the main technical challenges in implementing the above computer systems is the ability for the computer system to detect an object present around the vehicle—such as the vehicle in front of the present vehicle (the present vehicle having the computer system onboard), which vehicle in front may pose a risk/danger to the present vehicle and may require the computer system to take a corrective measure, be it breaking or otherwise changing speed, stopping or changing lanes. On a more granular level, the challenge of the object detection is not just the binary detection (presence or absence of the object), but the speed and accuracy associated with such an analysis and determination (especially avoiding "false negatives", whereby the system does not identify an object which is indeed present in front or around the vehicle).

The acuteness of this problem is illustrated by the following hypothetical scenario. Imagine that the self-driving or partially-autonomous vehicle is driving along the route. A child (or an adult, a pet, and the like) runs in front of the vehicle. It is imperative that the computer system controlling the vehicle detects the presence of the object fast and take corrective actions to avoid the collision. Naturally, the faster the computer system detects the presence of the object, the more time the computer system will have to determine the corrective action and to command the vehicle to execute the corrective action.

There are several object-detection methods known in the art.

U.S. Pat. No. 9,530,062 (granted on 2016 Dec. 27 to Nguyen et al., and assigned to Volkswagen AG) discloses an in-vehicle system for estimating a lane boundary based on raised pavement markers that mark the boundary. The in-vehicle system includes a camera for obtaining image data regarding reflective raised pavement markers and non-reflective raised pavement markers, an image processor for processing frames of image data captured by the camera, a lidar detector for obtaining lidar data regarding reflective raised pavement markers, and a lidar processor for processing frames of lidar data captured by the lidar detector. The image processor generates a first probabilistic model for the lane boundary and the lidar processor generates a second probabilistic model for the lane boundary. The in-vehicle system fuses the first probabilistic model and the second probabilistic model to generate a fused probabilistic model and estimates the lane boundary based on the fused probabilistic model.

U.S. Pat. No. 9,710,714 (granted on 2017 Jul. 18 to Chen et al., and assigned to Nokia Technologies OY) discloses point cloud data that is received and a ground plane is segmented. A two-dimensional image of the segmented ground plane is generated based on intensity values of the segmented ground plane. Lane marking candidates are determined based on intensity within the generated two-dimensional image. Image data is received and the generated two-dimensional image is registered with the received image data. Lane marking candidates of the received image data are determined based on the lane marking candidates of the registered two-dimensional image. Image patches are selected from the two-dimensional image and from the received image data based on the determined lane markings. Feature maps including selected image patches from the registered two-dimensional image and received data are generated. The set of feature maps are sub-sampled, and a feature vector is generated based on the set of feature maps. Lane markings are determined from the generated feature vector.

WO patent application 2016/100814 (published on 2016 Jun. 23 to Giering et al.) discloses a method includes fusing multi-modal sensor data from a plurality of sensors having different modalities. At least one region of interest is detected in the multi-modal sensor data. One or more patches of interest are detected in the multi-modal sensor data based on detecting the at least one region of interest. A model that uses a deep convolutional neural network is applied to the one or more patches of interest. Post-processing of a result of applying the model is performed to produce a post-processing result for the one or more patches of interest. A perception indication of the post-processing result is output.

WO patent application 2016/122969 (published on 2016 Aug. 4 to Ratcliffe) discloses a vehicle driver assist system includes an expert evaluation system to fuse information acquired from various data sources. The data sources can correspond to conditions associated with the vehicle as a unit as well as external elements. The expert evaluation system monitors and evaluates the information from the data sources according to a set of rules by converting each data value into a metric value, determining a weight for each metric, assigning the determined weight to the metric, and generating a weighted metric corresponding to each data value. The expert evaluation system compares each weighted metric (or a linear combination of metrics) against one or more thresholds. The results from the comparison provide an estimation of a likelihood of one or more traffic features occurring.

SUMMARY

Developers of the present technology are aware of vehicles (computer assist or autonomously driveable vehicles) that are equipped with multiple sensors—such as a first sensor (i.e. a camera or the like) and a second sensor (such as a LIDAR based instrument).

Embodiments of the present technology have been developed based on developers' appreciation that it may be beneficial to enrich the 3-D point cloud data (such as the Lidar data) for a particular region with relevant data from a captured photo image. Developers have further appreciated that the main challenge of "correlating" information in the 2-D image and the 3-D point cloud data (such as the Lidar data) is that the projection from Lidar data (3-D) to the captured image (2-D), or vice versa, is by definition imprecise. Objects that may be far away from each other in 3-D (and therefore being mutually irrelevant) may appear close to each other in the 2-D projection (and therefore provide "noise" information vis-a-vis the anchor object in 3-D).

Broadly speaking, embodiments of the present technology are directed to the use of two convolutional neural networks (CNN) to identify the relevant information from the 2-D photo image for the relevant area of the 3-D point cloud data (such as the Lidar data). In a sense, the non-limiting embodiments of the present technology are directed to using information of the photo image (for example, color, intensity, etc.) to "color" (i.e. enrich) the information provided by the 3-D point cloud data (such as the Lidar data).

It is noted, as a fundamental aspect of the non-limiting embodiments of the present technology, is that the photo image and the 3-D point cloud data (such as the Lidar data) are "calibrated" together. In other words, the non-limiting embodiments of the present technology can generally identify a given region of the photo image that generally corresponds to a given areas of the Lidar cloud.

In accordance with a first broad aspect of the present technology, there is provided a method of determining an object potentially present around a vehicle, the vehicle having: a first sensor configured to capture an image of a surrounding area; a second sensor configured to capture a 3-D point cloud data of the surrounding area; a processor coupled to the first sensor and the second sensor, the processor having access to computer-executable instructions, which instructions when executed cause the processor to execute: receiving, from the first sensor the image captured by the first sensor; processing the image to generate an image tensor representative of information contained therein; receiving, from the second sensor, an indication of the 3-D point cloud data captured by the second sensor; processing the 3-D point cloud data to generate a 3-D point cloud data tensor representative of information contained therein including at least one portion of the 3-D point cloud data having information about at least one object candidate; analyzing the image tensor to identify a relevant data portion of the image information relevant to the at least one object candidate; amalgamating the 3-D point cloud data tensor with a relevant portion of the image tensor associated with the relevant data portion of the image information to generate an amalgamated tensor associated with the surrounding area; storing the amalgamated tensor, the amalgamated tensor to be used by a machine learning algorithm (MLA) to determine presence of the object in the surrounding area.

In some embodiments of the method, the method further comprises training the MLA, the training the MLA comprises feeding the MLA a training set, the training set including at least:

the image;

the 3-D point cloud data;

an indication of the presence of the at least one object candidate as a target for training;

the training resulting the MLA being trained to predict the object potentially present around the vehicle using the amalgamated tensor.

In some embodiments of the method, the indication of the presence of the at least one object comprises an indication of a class of the at least one object, the class being one of a set of pre-determined classes.

In some embodiments of the method, the MLA is a first MLA, and wherein processing the 3-D point cloud data to generate a 3-D point cloud data tensor representative of information contained therein including at least one object candidate comprises:

processing the 3-D point cloud data by a Convolutional Neural Network (CNN) to generate the 3-D point cloud tensor.

In some embodiments of the method, the method further comprises pre-processing the 3-D point cloud data prior to the processing by the CNN, the pre-processing comprises:

parsing a 3-D point cloud data into a plurality of 2-D layers;

adding an additional layer providing at least one analytical feature related to an associated 3-D portion of the 3-D point cloud data; and wherein the processing the 3-D point cloud data to generate a 3-D point cloud data tensor comprises processing the plurality of 2-D layers and the additional layer.

In some embodiments of the method, the at least one analytical feature comprises at least one of: a number of dots in the associated region of the 3-D point cloud data, a "height" of the dot, and an intensity of dots.

In some embodiments of the method, the processing the plurality of 2-D layers and the additional layer comprises generating two tensors:

a first tensor $L \in R^{W \times H \times C}$, where

L is a tensor of features;

W and H are spatial dimensions;

C is a number of features; and a second tensor $Q \in R^{W \times H \times M}$, where Q is a tensor of queries;

W and H are spatial dimensions;

M is a number of features.

In some embodiments of the method, the processing the image to generate an image tensor representative of information contained therein comprises processing the image using a Convolutional Neural Network (CNN).

In some embodiments of the method, the image tensor comprises two tensors:
a first tensor $V \in \mathbb{R}^{W' \times H' \times D}$
where
V is a tensor of values;
W' and H' are spatial dimensions;
D is a number of features;
and
a second tensor $K \in \mathbb{R}^{W' \times H' \times M'}$,
where
K is a tensor of keys;
W' and H' are spatial dimensions;
M is a number of features.

In some embodiments of the method, the tensor K is used by an "attention" algorithm to generate weight parameters.

In some embodiments of the method, the tensor of values V is weighted by the weight parameters generated by the "attention" algorithm calculation.

In some embodiments of the method, wherein the processing the 3-D point cloud data to generate a 3-D point cloud data tensor representative of information contained therein including at least one object candidate comprises processing the 3-D point cloud data by a first Convolutional Neural Network (CNN) to generate the 3-D point cloud tensor; and the processing the image to generate an image tensor representative of information contained therein comprises processing the image using a second CNN.

In some embodiments of the method, the method further comprises training the first CNN and the second CNN, wherein the training is based on a prediction made by the MLA, the prediction is used to calculate a loss function.

In some embodiments of the method, the prediction further includes an indication of a predicted orientation.

In some embodiments of the method, the loss function is based at least in part on the predicted orientation.

In some embodiments of the method, the training comprises generating an orientation adjustment parameter, which is based on the predicted orientation and an actual orientation of the at least one object.

In some embodiments of the method, the method further comprises using the MLA to predict a presence parameter associated with the object candidate, the presence parameter being one of a presence indicator and an absence indicator.

In some embodiments of the method, the method further comprises using the MLA to predict a presence parameter associated with the at least one object candidate, the presence parameter being an indication of a class of objects associated with the at least object candidate, the class being one of a set of pre-determined classes.

In some embodiments of the method, the presence parameter comprises size parameters of a 3-D parallelepiped and coordinates of a center point thereof.

In some embodiments of the method:
the image tensor comprises two tensors:
a first tensor $V \in \mathbb{R}^{W' \times H' \times D}$
where
V is a tensor of values;
W' and H' are spatial dimensions;
D is a number of features;
and
a second tensor $K \in \mathbb{R}^{W' \times H' \times N}$,
where
K is a tensor of keys;
W' and H' are spatial dimensions;
M is a number of features;
and wherein the 3-D point cloud data tensor comprises:
a first tensor $L \in \mathbb{R}^{W \times H \times C}$,
where
L is a tensor of features;
W and H are spatial dimensions;
C is a number of features.
a second tensor $Q \in \mathbb{R}^{W \times H \times M}$,
where
Q is a tensor of queries;
W and H are spatial dimensions;
M is a number of features.

In some embodiments of the method:
the determining the associated region of the image data comprises identifying a given query for a given query q=Qi from the tensor of queries; and wherein
the amalgamating the 3-D point cloud data tensor with the relevant portion to generate an amalgamated tensor comprises:
calculating, for the given query q, a scalar multiplication value of vectors of the query vector and the key vector $\omega j = \langle q, K j \rangle$;
transforming the scalar multiplication value of vectors into a transformed vector $$\hat{\omega}_j = \frac{e^{\omega_j}}{\sum_k e^{\omega_k}};$$

using the transformed vector as a weight for the vector of features of the image by calculating a weighted sum of the vector of values $v = \Sigma_j \hat{\omega}_j V_j$;
concatenating the weighted sum $F_i = [L_i, v]$ to generate the amalgamated tensor of the 3-D point cloud data tensor with the relevant portion.

In some embodiments of the method, the method further comprises repeating the determining the respective region for each value of the query q to generate the amalgamated tensor $F \in \mathbb{R}^{W \times H \times (C+D)}$.

In some embodiments of the method, the first sensor is a camera and the second sensor is a LIDAR instrument.

In some embodiments of the method, the method further comprises calibrating the first sensor and the second sensor such that the processor is configured to identify a given region of the image that correspond to a given region of the 3-D point cloud.

In some embodiments of the method, the method further comprises defining a pre-determined area of the 3-D point cloud data that potentially contains the at least one object candidate.

In accordance with another broad aspect of the present technology, there is provided a processor of an electronic device, the processor having access to
a first sensor configured to capture an image of a surrounding area;
a second sensor configured to capture a 3-D point cloud data of the surrounding area;
the processor having access to computer-executable instructions, which instructions when executed cause the processor to execute:
receive, from the first sensor the image captured by the first sensor;
process the image to generate an image tensor representative of information contained therein;
receive, from the second sensor, an indication of the 3-D point cloud data captured by the second sensor;
process the 3-D point cloud data to generate a 3-D point cloud data tensor representative of information contained therein including at least one portion of the 3-D point cloud data having information about at least one object candidate;

analyze the image tensor to identify a relevant data portion of the image information relevant to the at least one object candidate;

amalgamate the 3-D point cloud data tensor with a relevant portion of the image tensor associated with the relevant data portion of the image information to generate an amalgamated tensor associated with the surrounding area;

store the amalgamated tensor, the amalgamated tensor to be used by a machine learning algorithm (MLA) to determine presence of the object in the surrounding area.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
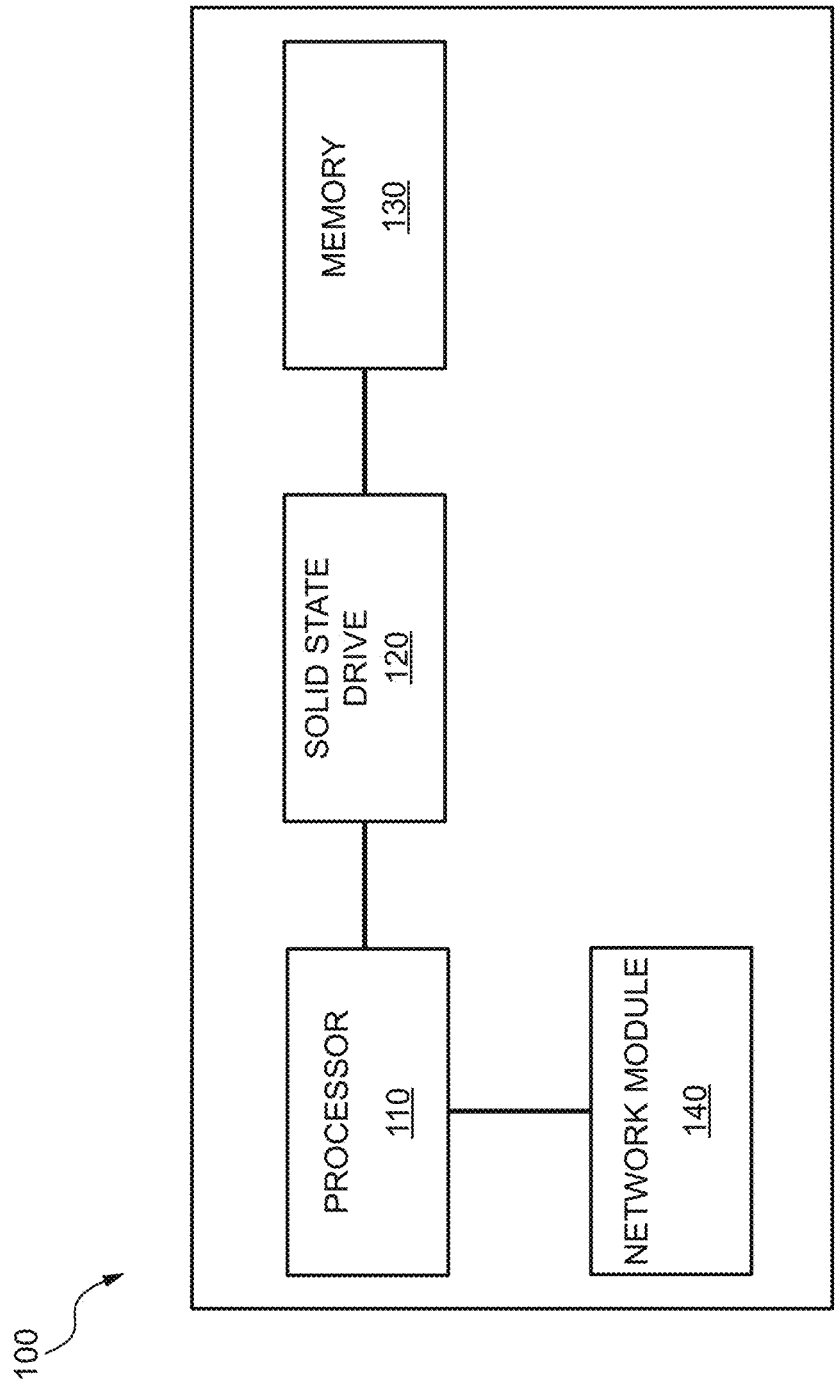
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring initially to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, locationalization modules, and the like.

Figure 2:
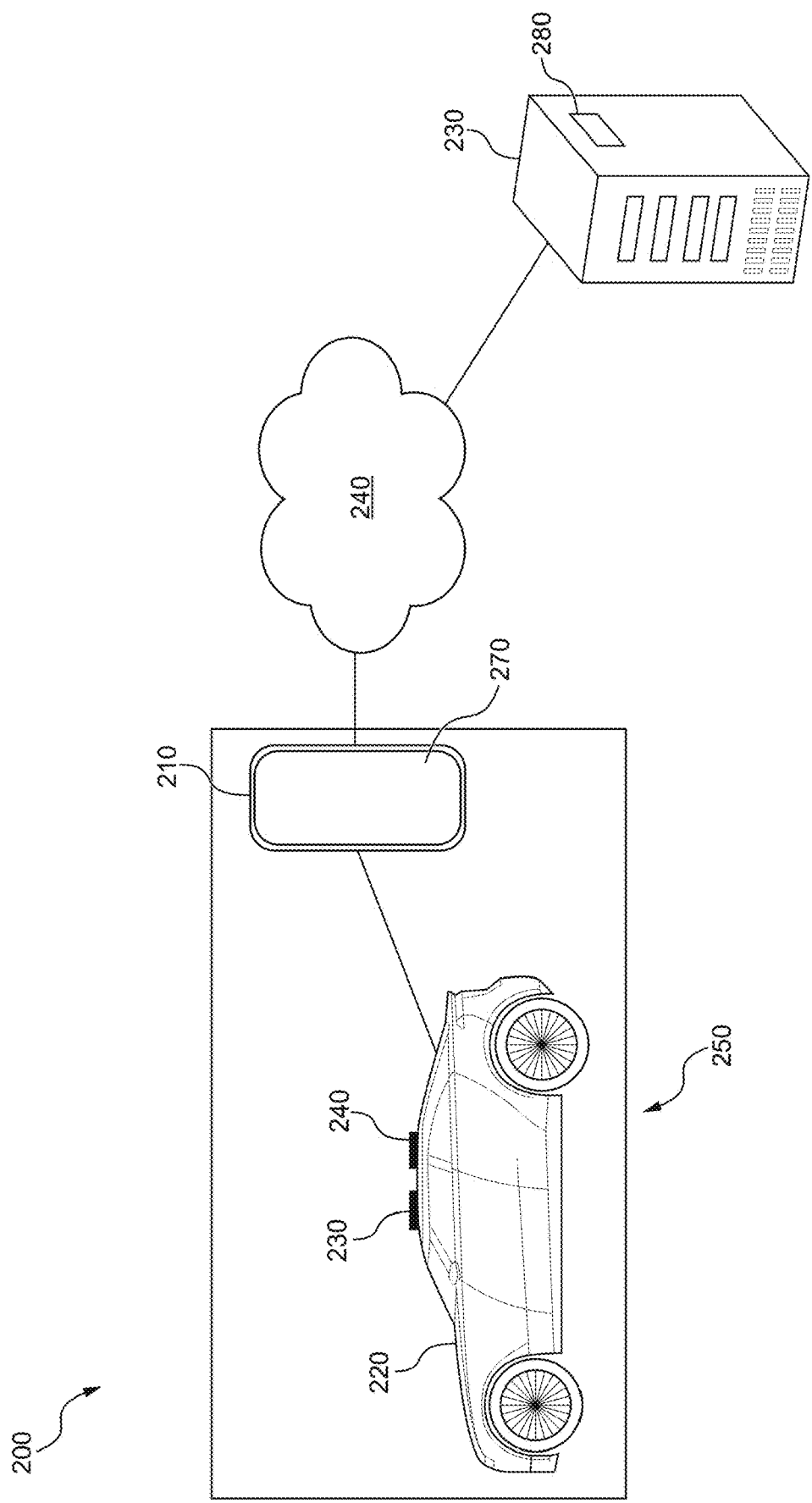
FIG. 2 depicts a networked computing environment being suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, or associated with a user (not depicted) who can operate the vehicle 220, a server 235 in communication with the electronic device 210 via a communication network 245 (e.g. the Internet or the like, as will be described in greater detail herein below). Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220 to which the electronic device 210 is associated may comprise any leisure or transportation vehicle such as a private or commercial car, truck, motorbike or the like. The vehicle may be user operated or a driver-less vehicle. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, a personal computer built into the vehicle 220 and the like. Thus, it should be noted that the electronic device 210 may or, ay not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, solid-state drive 120 and the memory 130. In other words, the electronic device 210 comprises hardware and/or software and/or firmware, or a combination thereof, for determining the presence of an object around the vehicle 220, as will be described in greater detail below.

In accordance to the non-limiting embodiments of the present technology, the electronic device 210 further comprises or has access to: a first sensor 230 configured to capture an image of a surrounding area 250 and a second sensor 240 configured to capture a 3-D point cloud data of the surrounding area 250. The first sensor 230 and the second sensor 240 are operatively coupled to the processor 110 for transmitting the so-captured information to the processor 110 for processing thereof, as will be described in greater detail herein below.

In a specific non-limiting example, the first sensor 230 comprises a camera. How the camera is implemented is not particularly limited. For example, in one specific non-limiting embodiments of the present technology, the camera can be implemented as a mono camera with resolution sufficient to detect objects at a pre-determined distances of up to about 30 m (although cameras with other resolutions and ranges are within the scope of the present disclosure). The camera can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, the first sensor 230 can be mounted in a dedicated enclosure (not depicted) mounted on the top of the vehicle 220.

In some non-limiting embodiments of the present technology, the first sensor 230 can be implemented as a plurality of cameras. For example, the plurality of cameras may have a sufficient number of cameras to capture a surrounding/panoramic image of the surrounding areas 250.

In some embodiments of the present technology, the camera (or one or more cameras that make up the implementation of the first sensor 230) is configured to capture a pre-determine portion of the surrounding area 250 around the vehicle 220. In some embodiments of the present technology, the camera is configured to capture an image (or a series of images) that represent approximately 90 degrees of the surrounding area 250 around the vehicle 220 that are along a movement path of the vehicle 220.

In other embodiments of the present technology, the camera is configured to capture an image (or a series of images) that represent approximately 180 degrees of the surrounding area 250 around the vehicle 220 that are along a movement path of the vehicle 220. In yet additional embodiments of the present technology, the camera is configured to capture an image (or a series of images) that represent approximately 360 degrees of the surrounding area 250 around the vehicle 220 that are along a movement path of the vehicle 220 (in other words, the entirety of the surrounding area around the vehicle 220).

In a specific non-limiting example, the first sensor 230 can be implemented as the camera may be of the type available from FLIR Integrated Imaging Solutions Inc., 12051 Riverside Way, Richmond, BC, V6W 1K7, Canada. It should be expressly understood that the first sensor 230 can be implemented in any other suitable equipment.

In a specific non-limiting example, the second sensor 240 comprises a Light Detection and Ranging (LIDAR) instrument. Lidar stands for LIght Detection and Ranging. It is expected that a person skilled in the art will understand the functionality of the LIDAR instrument, but briefly speaking, a transmitter (not depicted) of the second sensor 240 implemented as the LIDAR sends out a laser pulse and the light particles (photons) are scattered back to a receiver (not depicted) the second sensor 240 implemented as the LIDAR instrument. The photons that come back to the receiver are collected with a telescope and counted as a function of time. Using the speed of light (~$3\times10^8$ m/s), the processor 110 can then calculate how far the photons have traveled (in the round trip). Photons can be scattered back off of many different entities surrounding the vehicle 220, such as other particles (aerosols or molecules) in the atmosphere, other card, stationary objects or potential obstructions in front of the vehicle 220.

In a specific non-limiting example, the second sensor 240 can be implemented as the LIDAR based sensor that may be of the type available from Velodyne LiDAR, Inc. of 5521 Hellyer Avenue, San Jose, Calif. 95138, United States of America. It should be expressly understood that the second sensor 240 can be implemented in any other suitable equipment.

In some embodiments of the present technology, the second sensor 240 can be implemented as a plurality of LIDAR based sensor, such as three for example or any other suitable number. In some embodiments of the present technology, the second sensor 240 (whether implemented as a single LIDAR based sensor or multiple LIDAR based sensors) can be housed in the above-mentioned enclosure (not separately depicted) located on the roof of the vehicle 220.

In those embodiments of the present technology, where the second sensor 240 is implemented as multiple LIDAR based sensors housed in the enclosure (not depicted), the spatial placement of the multiple LIDAR based sensors can be designed taking into account the specific technical configuration of the multiple LIDAR based sensors, configuration of the enclosure, weather conditions of the area where the vehicle 220 is to be used (such as frequent rain, snow, and other elements) or the like.

In some embodiments of the present technology, the first sensor 230 and the second sensor 240 are calibrated such that for the image captured by the first sensor 230 and the 3-D point cloud captured by the second sensor 240, the processor 110 is configured to identify a given region of the image that correspond to a given region of the 3-D point cloud. This calibration can be executed during the manufacturing and/or set up of the vehicle 220. Or at any suitable time thereafter or, in other words, the calibration can be executed during retrofitting the vehicle 220 with the first sensor 230 and the second sensor 240 in accordance with the non-limiting embodiments of the present technology contemplated herein. Alternatively, the calibration can be executed during equipping the vehicle 220 with the first sensor 230 and the second sensor 240 in accordance with the non-limiting embodiments of the present technology contemplated herein.

In some embodiments of the present technology, the communication network 245 is the Internet. In alternative non-limiting embodiments, the communication network can be implemented as any suitable local area network (LAN), wide area network (WAN), a private communication network or the like. It should be expressly understood that implementations for the communication network are for illustration purposes only. A communication link (not separately numbered) between the electronic device 210 and the communication network 245 is implemented will depend inter alia on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 245 may also use a wireless connection with the server 235.

In some embodiments of the present technology, the server 235 is implemented as a conventional computer server and may comprise some or all of the components of the computer system 1 of FIG. 1. In one non-limiting example, the server 112 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like. In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

The processor 110 is coupled to the first sensor 230 and the second sensor 240 for receiving image data therefrom. The processor 110 has access to computer-executable instructions (for example, stores by the solid-state drive 120 or the memory 130), which instructions when executed cause the processor 110 to execute: (i) receiving, from the first sensor 230 the image captured by the first sensor 230; (ii) processing the image to generate an image tensor representative of information contained therein; (iii) receiving, from the second sensor 240, an indication of the 3-D point cloud data captured by the second sensor 240; (iv) processing the 3-D point cloud data to generate a 3-D point cloud data tensor representative of information contained therein including at least one portion of the 3-D point cloud data having information about at least one object candidate; (v) analyzing the image tensor to identify a relevant data portion of the image information relevant to the at least one object candidate; (vi) amalgamating the 3-D point cloud data tensor with a relevant portion of the image tensor associated with the relevant data portion of the image information to generate an amalgamated tensor associated with the surrounding area; (vii) storing the amalgamated tensor, the amalgamated tensor to be used by a machine learning algorithm (MLA) to determine presence of the object in the surrounding area 250.

Each of these functions of the processor 110 will now be described in greater detail. The description presented herein below will first describe the process functionally and, then, using non-limiting examples of mathematical formulas that can be implemented by the processor 110 to affect various calculations.

Receiving the Image Captured by the First Sensor 230

Figure 3:
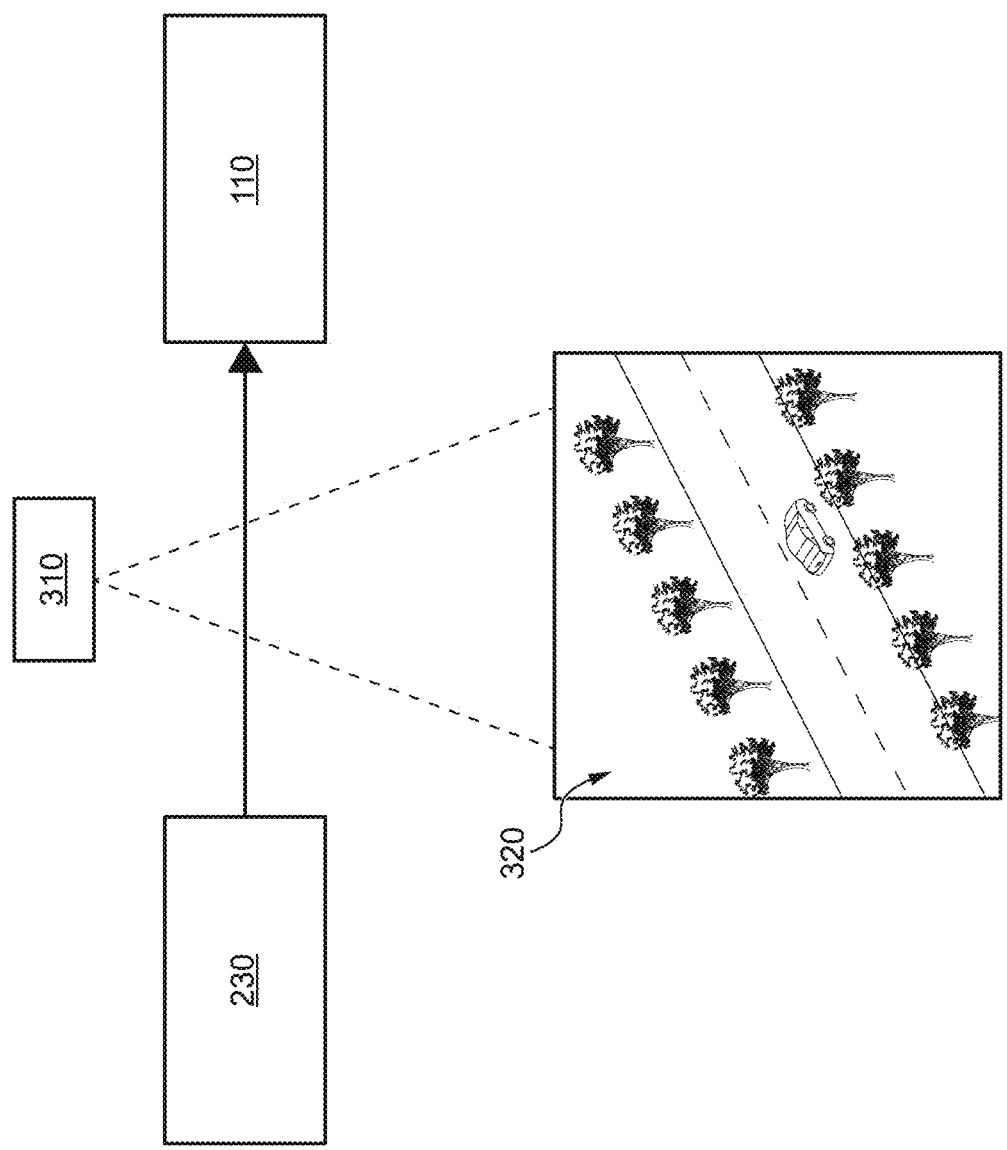
FIG. 3 depicts a process of the processor receiving an image from the first sensor of the computer system of FIG. 1.

With reference to FIG. 3, there is depicted a process, executed by the processor 110, for receiving an image 310 from the first sensor 230. In some embodiments of the present technology, the image 310 is captured as a standard Red Green Blue (RGB) image. In some embodiments of the present technology, where the first sensor 230 is implemented as multiple cameras, the receiving of the image 310 may be receiving of a plurality of RGB images.

It is noted that the image 310 (or the plurality of images, as the case may be) are made off a plurality of pixels, schematically depicted in FIG. 3 at 320.

In some non-limiting embodiments of the present technology, the process of receiving the image 310 can be executed in a continuous manner. In other embodiments of the present technology, the process of receiving the image 310 can be implemented at pre-determined intervals, such every 2 milliseconds or any other suitable time interval.

Receiving, from the Second Sensor 240, an Indication of the 3-D Point Cloud Data Captured by the Second Sensor 240

Figure 4:
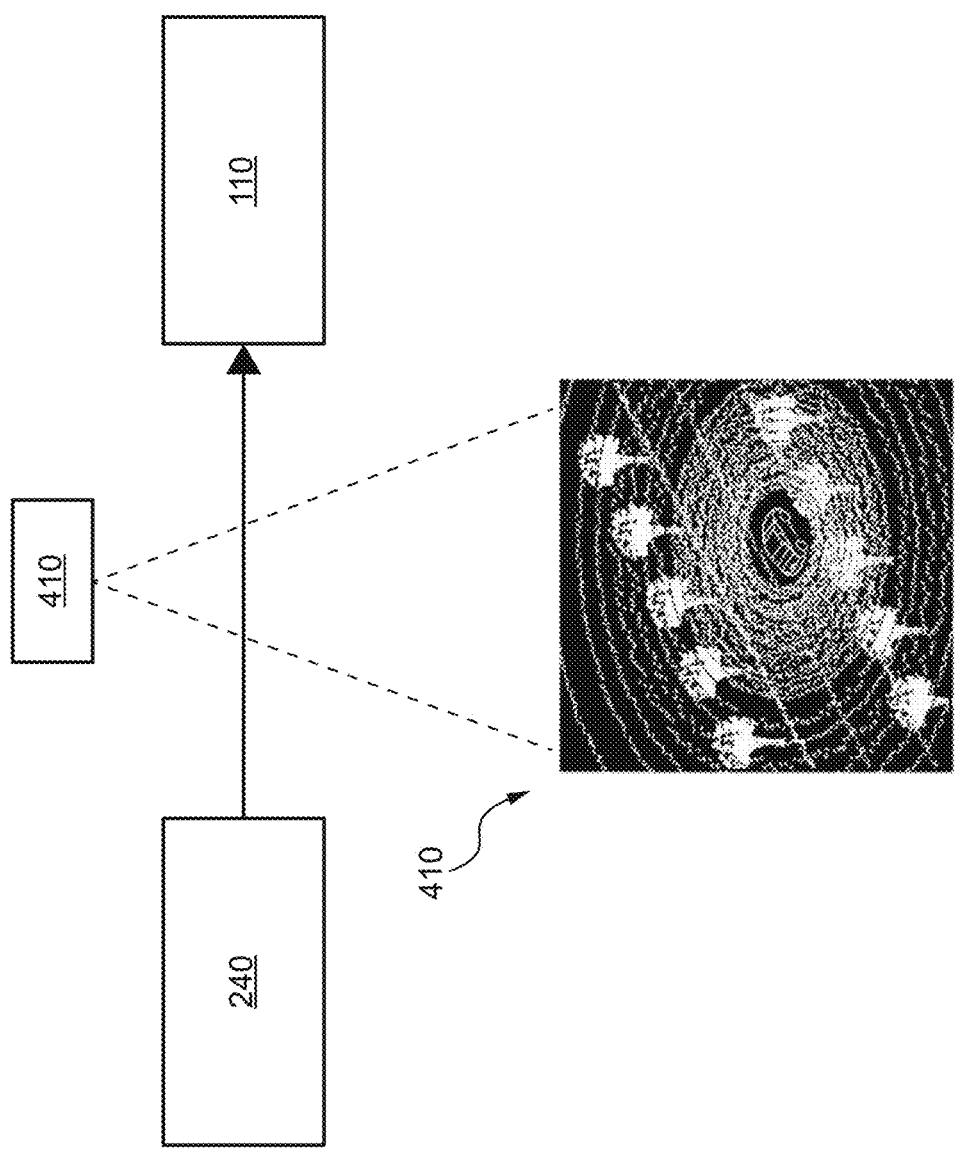
FIG. 4 depicts a process of the processor receiving the 3-D point cloud data captured by the second sensor of the computer system of FIG. 1.

With reference to FIG. 4, there is depicted a process, executed by the processor 110, for receiving the 3-D point cloud data 410 captured by the second sensor 240.

In some non-limiting embodiments of the present technology, the process of receiving the 3-D point cloud data 410 can be executed in a continuous manner. In other embodiments of the present technology, the process of receiving the 3-D point cloud data 410 can be implemented at pre-determined intervals, such every 2 milliseconds or any other suitable time interval.

Figure 5:
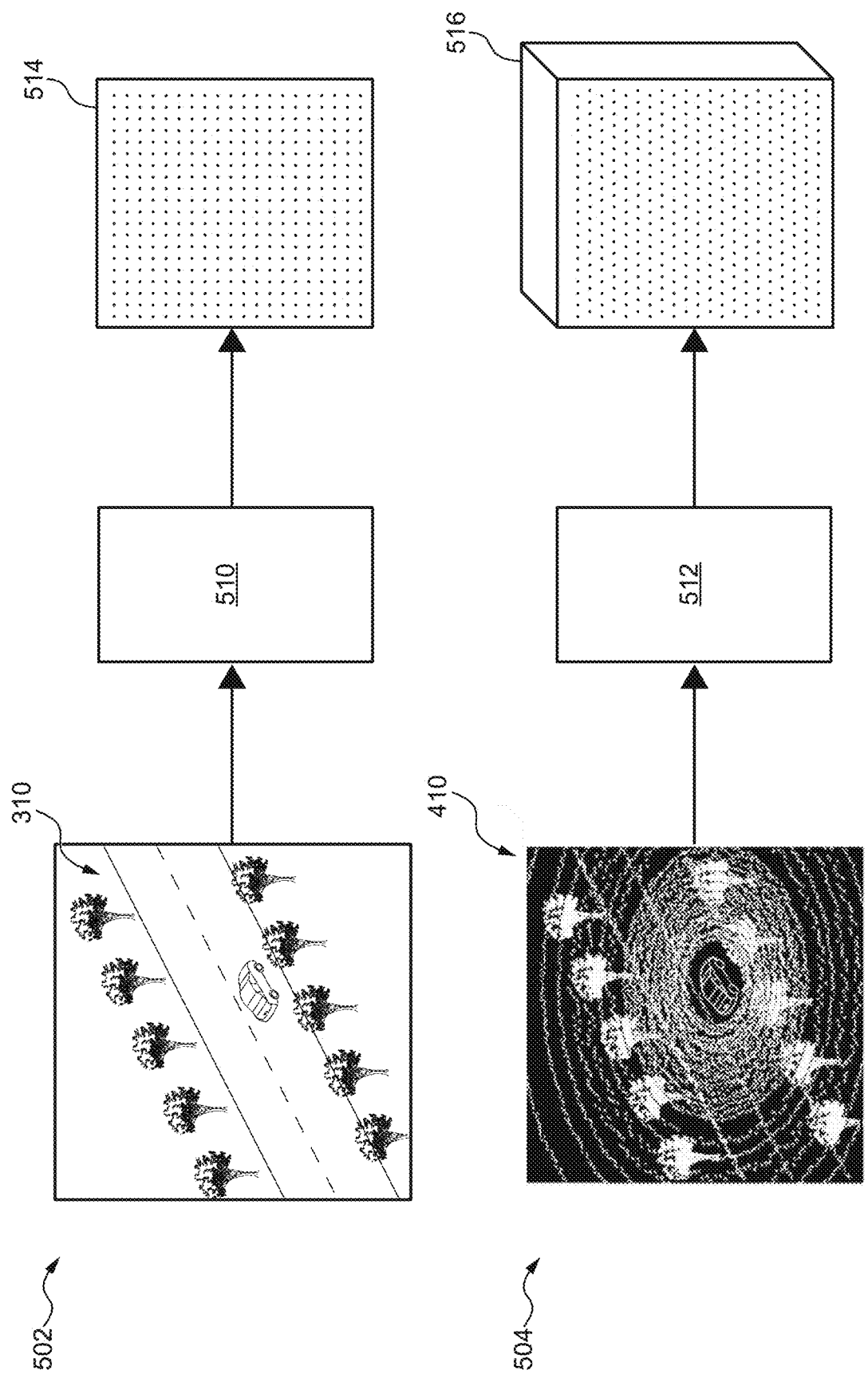
FIG. 5 depicts a process for a first stage of processing of the image and a first stage of a processing of process for processing the 3-D point cloud data of the computer system of FIG. 1.

First Stage of Processing the 3-D Point Cloud Data to Generate a 3-D Point Cloud Data Tensor Representative of Information Contained Therein Including at Least One Portion of the 3-D Point Cloud Data Having Information about at Least One Object Candidate and Processing the Image to Generate an Image Tensor Representative of Information Contained Therein, Namely Pre-Processing of the 3-D Point Cloud Data and the Image With reference to FIG. 5, where is depicted a process 502 for a first stage of processing of the image 310 and a first stage of a processing of process 504 for processing the 3-D point cloud data 410. Broadly speaking, the process 502 and the process 504 can be thought of as "pre-processing" of the respective image 310 and the 3-D point cloud data 410.

As part of the process 502, the processor 110 pre-processes the image 310 into a processed image 514 by applying a pre-processing algorithm 510. In some embodiments of the present technology, where the first sensor 230 is implemented as multiple cameras, the pre-processing algorithm 510 may include amalgamating the multiple captured images 310 into a single image that is the processed image 514. This pre-processing algorithm 510 can include standard processes for converting multiple images into a panoramic view. In these embodiments of the present technology, the processed image 514 is a panoramic view of the surrounding area 250.

Alternative or additionally, the processor 110 can pre-process the image 310 to extract a relevant portion of the image to render the processed image 514, in which case the pre-processing algorithm 510 can be computer-vision and analysis based algorithm. For example, the processor 110 can extract a portion of the image 310 that covers only an area in front of the vehicle 220. Alternatively, the processor can extract from the image 310 a portion that covers an area in front and to the side of the vehicle 220.

In other words, the pre-processing of the image 310 can include extracting a "visible" portion of the surrounding area 250 that is in "front" of the vehicle 220 (i.e. area in the direction of the movement of the vehicle 220—i.e. where the potential object that is in the way of the movement of the vehicle 220 may be present). Within these alternative embodiments of the present technology, the processed image 514 contains an extracted portion of the image 310, the extracted portion covering a pre-determined portion of the surrounding area 250, which portion is generally pre-determined based on the relevancy to the processes to be described below by virtue of potentially having information about objects that are "in the way" of the movement path of the vehicle 220.

As part of the process 504, the processor 110 processes the 3-D point cloud data 410 into a processed 3-D point cloud data 516. In some embodiments of the present technology, the processor 110 processes the 3-D point cloud data by generating a "bird's eye view" of the 3-D point cloud data to generate the processed 3-D point cloud data 516 by applying a pre-processing algorithm 512. This process can be implemented using known technologies. In some embodiments of the present technology, a "center point" of the bird's eye is identified—i.e. a point located in the middle (when viewed from above on both horizontal axis and vertical axis).

Figure 6:
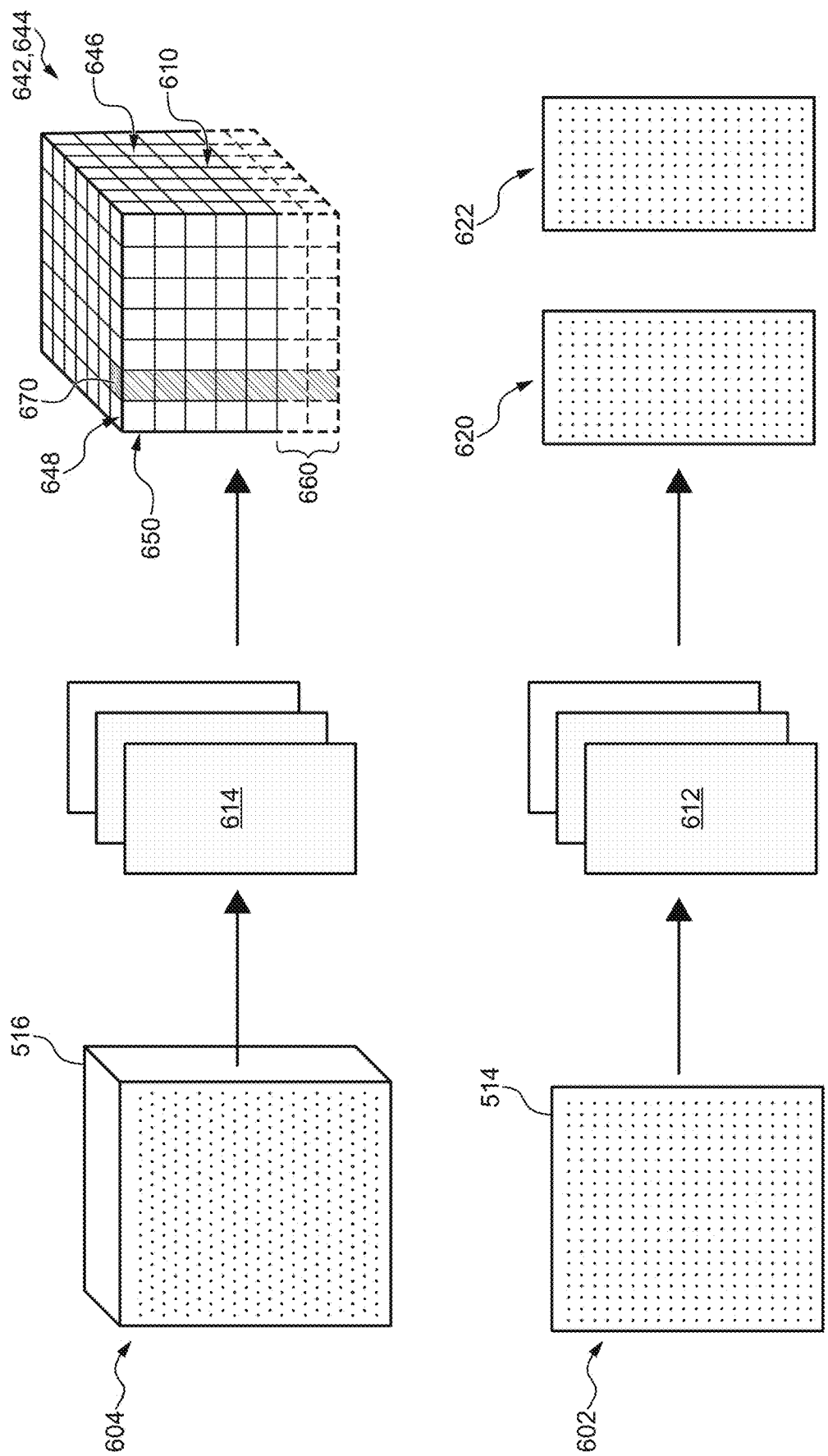
FIG. 6 depicts a process for a second stage of processing of the image (i.e. further processing of the processed image) and a process for a second of processing of the 3-D point cloud data (i.e. further processing of the processed 3-D point cloud data).

Second Stage of Processing the 3-D Point Cloud Data to Generate a 3-D Point Cloud Data Tensor Representative of Information Contained Therein Including at Least One Portion of the 3-D Point Cloud Data Having Information about at Least One Object Candidate and Processing the Image to Generate an Image Tensor Representative of Information Contained Therein, Namely Further Processing of the Processed 3-D Point Cloud Data and the Processed Image With reference to FIG. 6, there is depicted a process 602 for a second stage of processing of the image 310 (i.e. further processing of the processed image 514) and a process 604 for a second of processing of the 3-D point cloud data 410 (i.e. further processing of the processed 3-D point cloud data 516).

Broadly speaking, the process 602 and the process 504 can be thought of as "further processing" of the respective image 310 (namely, further processing of the processed image 514) and the 3-D point cloud data 410 (namely, further processing the processed 3-D point cloud data 410).

As part of the process 602, the relevant part of the image 310 (i.e. for example, the processed image 514) is processed through a first Convolutional Neural Network (CNN) 612 that is trained with a series of sequential filters to reduce, for each pixel of the processed image 514, information and create two feature maps—a key matrix 620 and a value matrix 622.

Broadly speaking, the value matrix 622 encodes what information that is contained in the associated given pixel. The key matrix 620 is functionally responsible for "answering the question" of whether the given pixel of the image 310 contains information that is useful for enriching a given region of the 3-D point cloud data (i. e. enriching the knowledge about an object contained therein).

In some embodiments of the present technology, the key matrix 620 is build in accordance with an "attention" paradigm of generating feature vectors. In other words, the key matrix 620 acts as a "pointer" or "attention grabber" towards a particular region (pixel) of the image 310 that is useful for enriching the given region of the 3-D point cloud data 410 (i. e. the object contained therein).

As part of the process 604, the relevant part of the processed 3-D point cloud data 516 is processed through a second Convolutional Neural Network (CNN) 612, the second CNN 614 configured to generate, based on the processed 3-D point cloud data 516, a feature matrix 642 and a query matrix 644. The process for generating the feature matrix 642 and the query matrix 644 can be implemented as follows, at least in some non-limiting embodiments of the present technology.

The processor 110 first applies a 3-D grid 646 onto the processed 3-D point cloud data 516 to parse the processed 3-D point cloud data 516 into a plurality of 2-D layers 610. The 3-D grid 646 is associated with a horizontal step 648 and a vertical step 650. The horizontal step 648 can be, for example, 10 cm. In some non-limiting embodiments of the present technology, the size of the horizontal step 648 is selected to find a balance between efficiency of processing and accuracy of the output. For example, a smaller value for the horizontal step 648 will lead to better accuracy, but slower processing speed (given the same processing power of the processor 110). By the same token, a larger value for the horizontal step 648 will lead to less accurate outcome, but faster processing speed (given the same processing power of the processor 110). The exact value for the horizontal step 648 can be determined by an operator of the server 235.

The vertical step 650 can be, for example, 0.5 meters. The exact value of the vertical step 650 can be selected, for example, by the operator of the server 235 based on several considerations. For example, a specific application of the methods and processes described herein. As an example, in those embodiments of the present technology, where the goal is to determine an object that can be an obstacle (such as a human, another vehicle or the like that are comparable in height to the vehicle 220), the vertical step 650 of 0.5 meters can be appropriate. In other embodiments of the present technology, where the goal is to determine an object that is closer to the ground (such as for example, a line marking, a curb, or the like)), the vertical step 650 of 0.1 meters can be appropriate.

In some non-limiting embodiments of the present technology, the processor 110 further adds an additional layer providing at least one analytical feature related to an associated 3-D portion of the 3-D point cloud data 410. In accordance with the non-limiting embodiments of the present technology, the at least one analytical feature can be at least one of: a number of dots in the associated region of the 3-D point cloud data 410, a "height" (expressed in terms of coordinates and the like) of the dot in the associated region of the 3-D point cloud data 410, and an intensity of dots in the associated region of the 3-D point cloud data 410, and the like. In the embodiment depicted in FIG. 6, the are depicted two additional layers 660.

Once processed by the second CNN 614, the 644 query matrix contains a number of vectors (i.e. the 3-D cloud data tensor), each vector identifying a particular region (column) of the processed 3-D point cloud data 516 and the feature matrix 642 containing information associated with the particular region of the processed 3-D point cloud data 516. This is schematically depicted in FIG. 6 at 670. The particular region 670 of the processed 3-D point cloud data 516 (which can also be thought of as "a block" or a "parallelepiped") would be processed into the respective 3-D cloud data tensor. It is noted that the particular region 670 is associated with a size and a center point (both not numbered in FIG. 6).

Analyzing the Image Tensor to Identify a Relevant Data Portion of the Image Information Relevant to the at Least One Object Candidate The processor 110 then uses the feature matrix 642, the query matrix 644, the key matrix 620 and the value matrix 622 to effectively enrich a particular region of the information contained in the original 3-D point cloud data 410 with the relevant information contained in the associated portion of the image 310.

It is important to note that in accordance with the non-limiting embodiments of the present technology, the processes described herein are aimed to ensure that the processor 110 selects the relevant information contained in the image 310 to enrich the 3-D point cloud data 410. It is noted that the information contained in the 3-D point cloud data 410 is "3-D" in nature, while information contained in the image 310 is "2-D". In other words, objects that are "far away" from each other and non-relevant in "3-D" may in fact appear close to each other in "2-D" and, therefore, be considered relevant (but in reality be "noise" due to their non-relevancy).

As such, the non-limiting embodiments of the present technology aim to identify only those portions of the image 310 that are actually relevant and would "enrich" the information contained in the 3-D point cloud data 410.

Broadly speaking, it can be said that in some non-limiting embodiments of the present technology, the processor 110 generates an amalgamated tensor based on a first vector generated by the first CNN 612 (i.e. the key matrix 620 and the value matrix 622) and a second vector generated by the second CNN 614 (i.e. the query matrix 644). In other words, it can be said that the amalgamated tensor is representative of the combined information contained in the (i) relevant region of the 3-D point cloud data 410 and (ii) the associated relevant information contained in the image 310.

More specifically, the processor 110, for each pixel of the image 310, generates a scalar multiplication (as an example, but other types of processing can be used as well) of a given query from the query matrix 644 and each vector of the key matrix 620. This results in a number of weights, each weight being indicative of with section of the image 310 that are relevant for the given region of the 3-D point cloud data 410.

In some embodiments of the present technology, the processor 110 can apply a soft max operation to translate the weight numbers into discreet distribution, this in effect renders a "weights mask". The weight mask can then be applied to the value matrix 622 to obtain relevant weighted information that is relevant to the given area of the 3-D point cloud data 410.

In other words, the above described operation provides a plurality of masks, where each quadrant of the mask provides a weight of whether or not the associated pixel of the image 310 provides relevant information for the query of the query matrix 644 (or, in other words, to the associated region of the 3-D point cloud data 410).

For example, if a relevant region of the 3-D point cloud data 410 contains data representative of a tree, a human, the mask may look as follows:

| 0 | 1 | 0 |
| 0 | 1 | 0 |
| 0 | 1 | 0 |
| 0 | 1 | 0 |
| 0 | 1 | 0 |

Where a "1" represent relevant information in the associated image 310 and a "0" represents "noise" (noise, in accordance with the non-limiting embodiments of the present technology denoting non-relevant information for the given portion of the 3-D point cloud data 410).

Mathematical Formulas

In some embodiments of the present technology, as part of the process 604, in order to process the relevant part of the processed 3-D point cloud data 516, the second CNN 614 processes the plurality of 2-D layers and the additional layer(s), such as the one or more of the depicted two additional layers 660, by generating the 3-D point cloud data tensor that comprises two tensors (i.e. the aforementioned feature matrix 642 and the query matrix 644, respectively):

a first tensor $L \in R^{W \times H \times C}$, where

L is a tensor of features;

W and H are spatial dimensions;

C is a number of features; and a second tensor $Q \in R^{W \times H \times M}$, where Q is a tensor of queries;

W and H are spatial dimensions;

M is a number of features.

In some embodiments of the present technology, as part of the process 602, in order to process the relevant part of the image 310, the first CNN 612 processes the processed image 514 generating the image tensor that comprises two tensors (i.e. the aforementioned value matrix 622 and the key matrix 620):

a first tensor $V \in R^{W' \times H' \times D}$, where

V is a tensor of values;

W' and H' are spatial dimensions are spatial dimensions;

D is a number of features; and a second tensor $K \in R^{W' \times H' \times M}$, where K is a tensor of keys;

W' and H' are spatial dimensions are spatial dimensions;

M is a number of features.

In some embodiments of the present technology, the determining the associated region of the image 310 comprises identifying a given query for a given query $q=Q_i$ from the tensor of queries. As such, the step of the amalgamating the 3-D point cloud data tensor with the relevant portion to generate an amalgamated tensor comprises:

calculating, for the given query q, a scalar multiplication value of vectors of the query vector and the key vector $\omega j = <q, Kj>$;

transforming the scalar multiplication value of vectors into a transformed vector $$\hat{\omega}_j = \frac{e^{\omega_j}}{\sum_k e^{\omega_k}};$$

using the transformed vector as a weight for the vector of features of the image by calculating a weighted sum of the vector of values $v = \Sigma_j \hat{\omega}_j V_j$;

concatenating the weighted sum $F_i = [L_j, v]$ to generate the amalgamated tensor of the 3-D point cloud data tensor with the relevant portion.

The step of the determining the respective region can be repeated for each value of the query q to generate the amalgamated tensor $F \in R^{W \times H \times (C+D)}$.

Storing the Amalgamated Tensor and Use of the Amalgamated Tensor

The amalgamated tensor generated in accordance with the non-limiting embodiments of the present technology can be stored, for example, in a storage (not depicted) associated with the server 235. The stored amalgamated tensor can be used by a machine learning algorithm (MLA) 280 executable by the server 235 to train to determine and/or to determine presence of the object in the surrounding area 250.

How the MLA 280 is implemented is not particularly limited. For example, the MLA 280 can be implemented as a Neural Network (NN). In some non-limiting embodiments of the present technology, the NN can be trained using gradient descent to create an enriched 3-D matrix that has a larger step than the original grid (i.e. larger than the horizontal step 648 and a vertical step 650). As an example, this larger step can be (but is not so limited) 80 cm by 80 cm.

Figure 7:
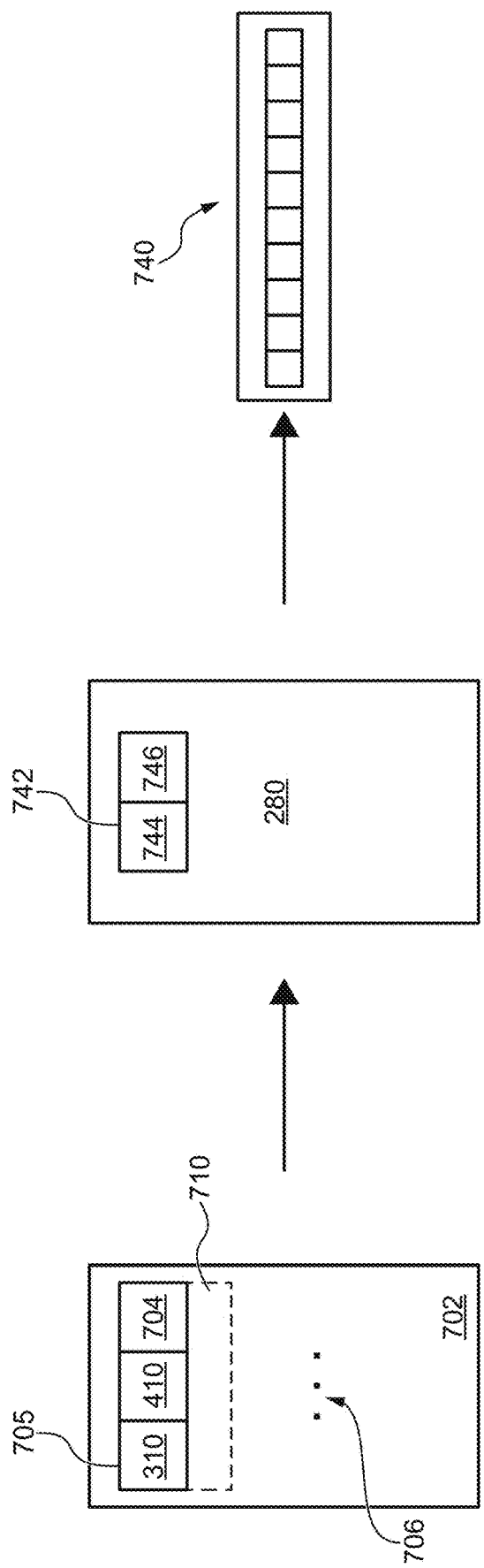
FIG. 7 depicts a process of using the amalgamated tensor in accordance to a non-limiting embodiment of the present technology.

With reference to FIG. 7, a process of using the amalgamated tensor will be described in greater detail, the FIG. 7 depicting a schematic representation of a non-limiting embodiments of the such the process.

Depicted in FIG. 7 is the MLA 280. More specifically, FIG. 7 depicts a training stage of the MLA 280. The MLA 280 receives a plurality of training sets 702. The plurality of training set 702, as an example, may include a first training set 705 that includes: the image 310, the 3-D point cloud data 410, and an indication of the presence 704 of the at least one object candidate as a target for training.

The image 310 and the 3-D point cloud data 410 is the original data received from the first sensor 230 and the second sensor 240. The indication of the presence 704 of the at least one object candidate is the "ground truth" that indicates the actual presence of the object candidate in the image 310. This information can be provided, for example, by human assessors (not depicted). Naturally, the indication of the presence 704 of the at least one object candidate can be generated by any other suitable means. For example, another Machine Learning Algorithm (not depicted) that is based on image vision algorithms can be used to recognize objects in the image 310 and to use the recognized objects as the ground truth.

Optionally and/or additionally and/or alternatively the first training set 705 may include an indication of an amalgamated tensor 710 (or the plurality of amalgamated tensors) generated for the image 310 and the 3-D point cloud data 410) as described above. In alternative non-limiting embodiments of the present technology, the indication of the amalgamated tensor 710 can be omitted, in which case, the amalgamated tensor can be generated as part of the training routine. Naturally, even though only a single instance of the first training set 705 is depicted, the plurality of training sets 702 will include a number of additional training sets 706, which would contain information similar in structure to that of the first training set 705.

It is noted that some of the examples provided in the plurality of training sets 702 will be "positive examples" teaching the MLA 280 to understand the presence of the potential object (i.e. the object candidates) and some examples will be "negative" teaching the MLA 280 to understand absence of the potential object (i.e. lack of the object candidate).

As part of the training, the MLA 280 generates a prediction formula 740, the prediction formula 740 enabling the MLA 280 being trained to predict the object potentially present around the vehicle 220 using the amalgamated tensor generated during the in-use phase of the MLA 280.

How the training is executed in at least some non-limiting embodiments of the present technology will now be described in greater detail. Based on the amalgamated tensor, the MLA 280 creates a prediction 742 for each of the enriched 3-D matrix cells. The prediction 742 has at least two components—an object candidate prediction 744 (i.e. is there an object of a given class present in the given enriched 3-D matrix cell) and an object orientation 746 (for those cells where the MLA 280 predicts that there is a candidate object). It is noted that in some embodiments of the present technology, the classes can be one or more of: a human, a cyclist, a car, a tree, etc. It is also noted that for some classes of predictions the object orientation 746 can be omitted. For example, for the human or cyclists, the object orientation 746 can be omitted.

In some embodiments of the present technology, the prediction 742 may alternatively or additionally include size parameters of a 3-D parallelepiped that could be drawn around the object candidate and coordinates of a center point thereof. The 3-D parallelepiped may correspond to the above-described particular region 670.

During training, the MLA 280 generates a plurality of instances of the prediction 742 (i.e. one for each of the enriched 3-D matrix cells). In some non-limiting embodiments of the present technology, the MLA 280 generates a vector (which can be implemented, for example, as a tensor) that encodes the object (and the object class, in at least some of the non-limiting embodiments of the present technology), orientation of the object, and optionally, the size of the parallelepiped and the center point of the parallelepiped.

The MLA 280 then generates the prediction for the known set (the known being marked, for example, by the human assessors) of the image 310 and the 3-D point cloud data 410. The actual position, which is marked, of the candidate objects is used to calculate a loss function indicative of the error between the prediction and the actual location of candidate objects (which can include some or all of the: orientation of the object, the size of the parallelepiped, and the center point of the parallelepiped).

In some non-limiting embodiments of the present technology the output of the loss function is used as a feedback for training the first CNN 612 and the second CNN 614. In other words, it can be said that the first CNN 612 and the second CNN 614 are trained to are trained to maximize the accuracy of the prediction of the MLA.

In-Use Processing

Once the first CNN 612, the second CNN 614, and the MLA 280 are trained (this point when the first CNN 612, the second CNN 614, and the MLA 280 are sufficiently trained are determined using standard validation techniques known in the art of training MLAs), the first CNN 612, the second CNN 614, and the MLA 280 receive an in-use image 310 and in-use 3-D point cloud data 410 and process it to determine an object candidate present in the surrounding area 250 of the vehicle 220. As has been explained above, non-limiting embodiments of the present technology, "enrich" information available in the 3-D point cloud data 410 with relevant information available in the image 310. This, in turn, may allow more accurate processing of the presence of the object candidate in the surrounding area 250. Additionally or alternatively, this may allow for faster identification of the presence of the object candidate in the surrounding area 250.

In some non-limiting embodiments of the present technology, the output of the processing of the first CNN 612, the second CNN 614, and the MLA 280 is the prediction of the presence of the object of a given class of the objects (the given class being one of a plurality of pre-defined classes). In this embodiments of the present technology, the indication of the presence of the given class of the object is provided to the processor 110. The processor 110 may have different software routines accessible thereto for taking various actions based on the class of the object.

For example, there could be different routines based on whether the object present in the surrounding area 250 is another vehicle or a human. The different routines may cause the vehicle 220 to slow down, to stop, to change lanes, to increase speed and the like. One should appreciate that the exact routine and action caused for the vehicle 220 to execute is not particularly limited and will depend on the specific implementation of the present technology.

The Method Description

Figure 8:
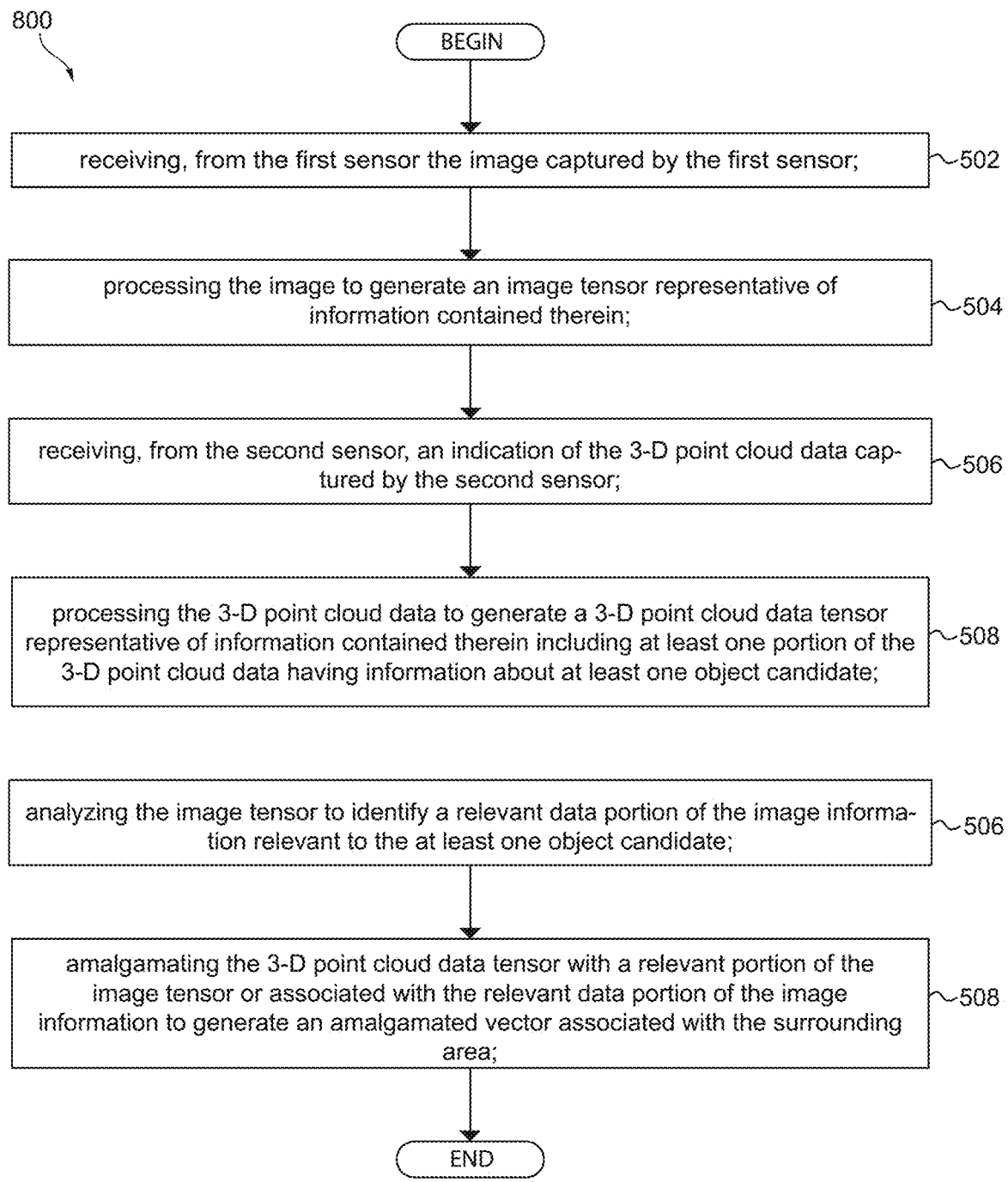
FIG. 8 depicts a flow chart of a method, the method executable in the system of FIG. 1, in accordance with the non-limiting embodiments of the present technology.

Given the architecture described above, it is possible to execute a method of predicting a presence of an object in the surrounding area 250 of the vehicle 220. With reference to FIG. 8, there is depicted a flow chart of a method 800, the method 800 executable by the processor 110 of the electronic device 210, at least in some non-limiting embodiments of the present technology. It is noted that in at least some non-limiting embodiments of the present technology, the method 800 can be partially or entirely executed by the server 235.

Step 802—Receiving, from the First Sensor the Image Captured by the First Sensor At step 802, the processor 110 receives, from the first sensor 230 the image 310 captured by the first sensor 230.

The process for the receiving of the image 310 has been described in detail above with reference to FIG. 3.

Step 804—Processing the Image to Generate an Image Tensor Representative of Information Contained Therein At step 804, the processor 110 processes the image 310 to generate an image tensor representative of information contained therein.

The process for the generation of the image tensor has been described in detail above with reference to FIG. 5 and FIG. 6.

Step 806—Receiving, from the Second Sensor, an Indication of the 3-D Point Cloud Data Captured by the Second Sensor At step 806, the processor 110 receives, from the second sensor 240, an indication of the 3-D point cloud data 410 captured by the second sensor 240.

The process for the receiving of the 3-D point cloud data 410 captured by the second sensor 240 has been described in detail above with reference to FIG. 4.

Step 808—Processing the 3-D Point Cloud Data to Generate a 3-D Point Cloud Data Tensor Representative of Information Contained Therein Including at Least One Portion of the 3-D Point Cloud Data Having Information about at Least One Object Candidate At step 808, the processor 110 processes the 3-D point cloud data 410 to generate a 3-D point cloud data tensor representative of information contained therein including at least one portion of the 3-D point cloud data having information about at least one object candidate.

The process for the generation of the 3-D point cloud data tensor has been described above with the reference to FIG. 5 and FIG. 6.

Step 810—Analyzing the Image Tensor to Identify a Relevant Data Portion of the Image Information Relevant to the at Least One Object Candidate At step 810, the processor 110, analyzes the image tensor to identify a relevant data portion of the image information relevant to the at least one object candidate.

The process for the analyzing of the image tensor has been described above with reference to FIG. 6.

Step 812—Amalgamating the 3-D Point Cloud Data Tensor with a Relevant Portion of the Image Tensor Associated with the Relevant Data Portion of the Image Information to Generate an Amalgamated Tensor Associated with the Surrounding Area At step 812, the processor 110 amalgamates the 3-D point cloud data tensor with a relevant portion of the image tensor associated with the relevant data portion of the image information to generate an amalgamated tensor associated with the surrounding area 250.

The process for amalgamating the 3-D point cloud data tensor with a relevant portion of the image tensor associated with the relevant data portion of the image information to generate an amalgamated tensor has been described above with reference to FIG. 6.

Step 814—Storing the Amalgamated Tensor, the Amalgamated Tensor to be Used by a Machine Learning Algorithm (MLA) to Determine Presence of the Object in the Surrounding Area At step 814, the processor 110 stores the amalgamated tensor, the amalgamated tensor to be used by a machine learning algorithm (MLA) to determine presence of the object in the surrounding area.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of determining an object potentially present around a vehicle, the vehicle having:
   a first sensor configured to capture an image of a surrounding area;
   a second sensor configured to capture a 3-D point cloud data of the surrounding area;
   a processor coupled to the first sensor and the second sensor, the processor having access to computer-executable instructions, which instructions when executed cause the processor to execute:

receiving, from the first sensor the image captured by the first sensor;

processing the image to generate an image tensor representative of information contained therein;

receiving, from the second sensor, an indication of the 3-D point cloud data captured by the second sensor;

processing the 3-D point cloud data to generate a 3-D point cloud data tensor representative of information contained therein including at least one portion of the 3-D point cloud data having information about at least one object candidate;

analyzing the image tensor to identify a relevant data portion of the image information relevant to the at least one object candidate;

amalgamating the 3-D point cloud data tensor with a relevant portion of the image tensor associated with the relevant data portion of the image information to generate an amalgamated tensor associated with the surrounding area; and storing the amalgamated tensor, the amalgamated tensor to be used by a first machine learning algorithm (first MLA) to determine presence of the object in the surrounding area, processing the 3-D point cloud data to generate a 3-D point cloud data tensor representative of information contained therein including at least one object candidate comprising:

processing the 3-D point cloud data by a Convolutional Neural Network (CNN) to generate the 3-D point cloud tensor;

pre-processing the 3-D point cloud data prior to the processing by the CNN, the pre-processing comprises:

parsing a 3-D point cloud data into a plurality of 2-D layers;

adding an additional layer providing at least one analytical feature related to an associated 3-D portion of the 3-D point cloud data, the processing the 3-D point cloud data to generate a 3-D point cloud data tensor comprising processing the plurality of 2-D layers and the additional layer.

2. The method of claim 1, wherein the method further comprises training the MLA, the training the MLA comprises feeding the MLA a training set, the training set including at least:

the image;

the 3-D point cloud data;

an indication of the presence of the at least one object candidate as a target for training;

the training resulting the MLA being trained to predict the object potentially present around the vehicle using the amalgamated tensor.

3. The method of claim 2, wherein the indication of the presence of the at least one object comprises an indication of a class of the at least one object, the class being one of a set of pre-determined classes.

4. The method of claim 1, wherein the at least one analytical feature comprises at least one of: a number of dots in the associated region of the 3-D point cloud data, a "height" of the dot, and an intensity of dots.

5. The method of claim 1, wherein the processing the plurality of 2-D layers and the additional layer comprises generating two tensors:

a first tensor $L \in R^{W \times H \times C}$, where

L is a tensor of features;

W and H are spatial dimensions;

C is a number of features; and a second tensor $Q \in R^{W \times H \times m}$, where Q is a tensor of queries;

W and H are spatial dimensions;

M is a number of features.

6. The method of claim 1, wherein the processing the image to generate the image tensor representative of information contained therein comprises processing the image using the Convolutional Neural Network (CNN).

7. The method of claim 1, wherein the image tensor comprises two tensors:

a first tensor $V \in R^{W' \times H' \times D}$ where

V is a tensor of values;

W' and H' are spatial dimensions;

D is a number of features;

and a second tensor $K \in R^{W' \times H' \times M}$, where

K is a tensor of keys;

W' and H' are spatial dimensions;

M is a number of features.

8. The method of claim 7, wherein the tensor K is used by an "attention" algorithm to generate weight parameters.

9. The method of claim 7, wherein the tensor of values V is weighted by the weight parameters generated by the "attention" algorithm calculation.

10. The method of claim 1, wherein:

the CNN is a first Convolutional Neural Network (CNN); and the processing the image to generate an image tensor representative of information contained therein comprises processing the image using a second CNN.

11. The method of claim 10, further comprising training the first CNN and the second CNN, wherein the training is based on a prediction made by the MLA, the prediction is used to calculate a loss function.

12. The method of claim 11, wherein the prediction further includes an indication of a predicted orientation.

13. The method of claim 12, wherein the loss function is based at least in part on the predicted orientation.

14. The method of claim 13, wherein training comprises generating an orientation adjustment parameter, which is based on the predicted orientation and an actual orientation of the at least one object.

15. The method of claim 1, further comprising using the MLA to predict a presence parameter associated with the object candidate, the presence parameter being one of a presence indicator and an absence indicator.

16. A method of determining an object potentially present around a vehicle, the vehicle having:

a first sensor configured to capture an image of a surrounding area;

a second sensor configured to capture a 3-D point cloud data of the surrounding area;

a processor coupled to the first sensor and the second sensor, the processor having access to computer-executable instructions, which instructions when executed cause the processor to execute:

receiving, from the first sensor the image captured by the first sensor;

processing the image to generate an image tensor representative of information contained therein;

receiving, from the second sensor, an indication of the 3-D point cloud data captured by the second sensor;

processing the 3-D point cloud data to generate a 3-D point cloud data tensor representative of information contained therein including at least one portion of the 3-D point cloud data having information about at least one object candidate;

analyzing the image tensor to identify a relevant data portion of the image information relevant to the at least one object candidate;

amalgamating the 3-D point cloud data tensor with a relevant portion of the image tensor associated with the relevant data portion of the image information to generate an amalgamated tensor associated with the surrounding area;

storing the amalgamated tensor, the amalgamated tensor to be used by a machine learning algorithm (MLA) to determine presence of the object in the surrounding area;

using the MLA to predict a presence parameter associated with the at least one object candidate, the presence parameter being an indication of a class of objects associated with the at least object candidate, the class being one of a set of pre-determined classes, the presence parameter comprising size parameters of a 3-D parallelepiped and coordinates of a center point thereof.

17. The method of claim 16, wherein
the image tensor comprises two tensors:
a first tensor $V \in R^{W' \times H' \times D}$
where
V is a tensor of values;
W' and H' are spatial dimensions;
D is a number of features;
and
a second tensor $K \in R^{W' \times H' \times M}$,
where
K is a tensor of keys;
W' and H' are spatial dimensions;
M is a number of features;
and wherein the 3-D point cloud data tensor comprises:
a first tensor $L \in R^{W \times H \times C}$,
where
L is a tensor of features;
W and H are spatial dimensions;
C is a number of features;
a second tensor $Q \in R^{W \times H \times M}$,
where
Q is a tensor of queries;
W and H are spatial dimensions;
M is a number of features.

18. The method of claim 17, wherein:
the determining the associated region of the image data comprises identifying a given query for a given query $q = Q_i$ from the tensor of queries; and wherein
the amalgamating the 3-D point cloud data tensor with the relevant portion to generate an amalgamated tensor comprises:
calculating, for the given query q, a scalar multiplication value of vectors of the query vector and the key vector $\omega_j = \langle q, K_j \rangle$;
transforming the scalar multiplication value of vectors into a transformed vector $$\hat{\omega}_j = \frac{e^{\omega_j}}{\sum_k e^{\omega_k}};$$

using the transformed vector as a weight for the vector of features of the image by calculating a weighted sum of the vector of values $v = \Sigma_j \hat{\omega}_j V_j$;
concatenating the weighted sum $F_i = [L_i, v]$ to generate the amalgamated tensor of the 3-D point cloud data tensor with the relevant portion.

19. The method of claim 18, further comprising repeating the determining the respective region for each value of the query q to generate the amalgamated tensor $F \in R^{W \times H \times (C+D)}$.

20. The method of claim 1, wherein the first sensor is a camera and the second sensor is a LIDAR instrument.

21. The method of claim 1, further comprising calibrating the first sensor and the second sensor such that the processor is configured to identify a given region of the image that correspond to a given region of the 3-D point cloud.

22. The method of claim 21, wherein the method further comprising defining a pre-determined area of the 3-D point cloud data that potentially contains the at least one object candidate.

23. A processor of an electronic device, the processor having access to:
a first sensor configured to capture an image of a surrounding area;
a second sensor configured to capture a 3-D point cloud data of the surrounding area; and
computer-executable instructions, which instructions when executed cause the processor to execute the method according to claim 1.

* * * * *